(12) United States Patent
Fynbo et al.

(10) Patent No.: US 12,025,098 B2
(45) Date of Patent: Jul. 2, 2024

(54) CONTROL OF YAW DRIVES FOR SEGMENTED TOOTHED YAW RING OF A WIND TURBINE

(71) Applicant: VESTAS WIND SYSTEMS A/S, Aarhus (DK)

(72) Inventors: Peter Fynbo, Risskov (DK); Torben Ladegaard Baun, Skødstrup (DK); Jesper Lykkegaard Neubauer, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 13 days.

(21) Appl. No.: 18/011,101

(22) PCT Filed: Jun. 15, 2021

(86) PCT No.: PCT/DK2021/050191
§ 371 (c)(1),
(2) Date: Dec. 16, 2022

(87) PCT Pub. No.: WO2021/254576
PCT Pub. Date: Dec. 23, 2021

(65) Prior Publication Data
US 2023/0258153 A1  Aug. 17, 2023

(30) Foreign Application Priority Data
Jun. 16, 2020  (DK) .......................... PA 2020 70394

(51) Int. Cl.
*F03D 7/02* (2006.01)
*F03D 80/80* (2016.01)

(52) U.S. Cl.
CPC .......... *F03D 7/0204* (2013.01); *F03D 80/88* (2016.05); *F05B 2270/329* (2013.01); *F05B 2270/80* (2013.01)

(58) Field of Classification Search
CPC .. F03D 7/0204; F03D 80/88; F05B 2270/329; F05B 2270/80; Y02E 10/72
See application file for complete search history.

(56) References Cited

U.S. PATENT DOCUMENTS

| | | | |
|---|---|---|---|
| 2010/0109327 A1 | 5/2010 | Nielsen et al. | |
| 2011/0006541 A1* | 1/2011 | Frederiksen | F03D 7/0204 290/55 |
| 2013/0115043 A1* | 5/2013 | Rosenvard | F03D 7/0204 415/13 |

FOREIGN PATENT DOCUMENTS

| | | |
|---|---|---|
| CN | 210033734 U | 2/2020 |
| EP | 1571334 A1 | 9/2005 |

(Continued)

OTHER PUBLICATIONS

Danish Patent Office, Search Report for Danish Patent Application No. PA 2020 70394, dated Nov. 24, 2020.

(Continued)

*Primary Examiner* — Joseph Ortega
(74) *Attorney, Agent, or Firm* — Patterson + Sheridan, LLP

(57) ABSTRACT

A method of yawing a nacelle in a wind turbine having a yawing assembly comprising a drive-ring and a plurality of drives configured to exert a torque during movement along the drive-ring and thereby move the nacelle relative to the tower. The drive-ring is made of drive-ring segments joined in intersections. The method comprises defining a location for each intersection, defining a reference torque exerted by the drives when moving along the drive-ring, defining a reduced torque being lower than the reference torque, determining when a crossing drive moves across the location of an intersection, and to increase the lifetime, exerting the reduced torque by the crossing drive.

23 Claims, 6 Drawing Sheets

(56) References Cited

FOREIGN PATENT DOCUMENTS

| EP | 2273104 | A2 | 1/2011 |
| EP | 2463521 | A2 | 6/2012 |
| EP | 2708738 | A1 | 3/2014 |
| EP | 3450745 | A1 | 3/2019 |
| EP | 3553310 | A1 | 10/2019 |
| EP | 3594492 | A1 | 1/2020 |
| KR | 20170016420 | A | 2/2017 |
| WO | 2019110060 | A1 | 6/2019 |

OTHER PUBLICATIONS

International Search Report and Written Opinion for PCT Application No. PCT/DK2021/050191, dated Sep. 15, 2021.

* cited by examiner

CONTROL OF YAW DRIVES FOR SEGMENTED TOOTHED YAW RING OF A WIND TURBINE

The invention relates to a rotational positioning system in a wind turbine, and more particular to a rotational positioning system for the wind turbine yaw system.

BACKGROUND

A wind turbine according to the state of the art is described in WO 2009/068036 A2. For yaw control, the same comprises a yaw mechanism with one or more yaw motors, i.e. rotational positioning drives, and a yaw bearing forming a rotatable connection between the wind turbine tower and the nacelle. The yaw drives engage with a drive-ring, a ring with an internal or external toothing and fixedly connected to the top of the tower or to the nacelle, via a pinion gear. Other wind turbine yawing systems are known from EP 1 571 334 A1 or from WO 2008/053017 A3.

Since wind turbines become larger and larger, the drive-ring becomes larger and larger, and the torque required for rotation of the nacelle increases.

SUMMARY

It is an object to allow manufacturing of the drive ring in segments and thereby to allow for easier manufacturing, replacement, and transportation without impacting the expectable lifetime of the yawing assembly.

It is a further object to increase safety of operation of wind turbines.

According to these and other objects, the invention is defined in the independent claims, further aspects of the invention are set forth in the dependent claims, the drawings, and in the following description.

According to the first aspect, the invention provides for a method of yawing a nacelle in a wind turbine having a yawing assembly comprising a drive-ring and a plurality of drives configured to engage the drive-ring and thereby move the nacelle relative to the tower, the drive-ring being constituted by a plurality of drive-ring segments joined in intersections, the method comprising:
 defining locations of the intersections relative to the drives,
 defining a reference torque exerted by the drives when moving the nacelle relative to the tower,
 defining a reduced torque being lower than the reference torque, and
 exerting the reduced torque by a crossing drive which is at an intersection.

The process may include determining a position or a time step where a crossing drive passes the intersection and reducing the torque in that time step. In the following, N_crossing is the number of drives crossing an intersection.

When the drive-ring is constituted by separate segments assembled in intersections, there is a risk that irregularities at the intersections, e.g. caused by an off-set between adjacent segments or caused by a tooth pattern not being perfectly continuous across an intersection. Since the torque is reduced for the crossing drives, wear on the drive-ring or drives can be reduced and the expected lifetime can be increased even if the segmentation of the drive-ring has introduced irregularities.

The drive-ring may be fixed to either the tower or the nacelle, and the drives are then attached to the other one of either the tower or the nacelle. Irrespective of the location of the drive-ring on the tower or the nacelle, we refer herein to a crossing drive to define a drive which crosses an intersection between two drive-ring segments. In one embodiment, the drives and thereby also the crossing drives are fixedly connected to the tower, and in another embodiment, they are movable together with the nacelle.

The yawing assembly may be controlled by a controller operating in accordance with known control principles, e.g. based on torque control or speed control.

The reduced torque is exerted by the crossing drive. The reduced torque may e.g. be applied in a reduction zone extending across the intersection, e.g. plus minus 0.1-10 degrees relative to the intersection, such as plus minus 0.5-10 degrees, or plus minus 0.5-1.0 degrees relative to the intersection. In one embodiment, the reduction zone is variable as a control setting in the controller of the yawing assembly.

The reduced torque may be exerted by the crossing drive for causing movement of the nacelle relative to the tower, i.e. while the crossing drive is actively driving the movement of the nacelle relative to the tower, or the reduced torque may be exerted by the crossing drive for counteracting movement of the nacelle relative to the tower, i.e. while the crossing drive is used as a brake for braking movement of the nacelle relative to the tower.

Braking may be effected by mechanical brakes acting on a drive pinion or rotor shaft of the drives, or braking may be effected electrically by reversing the electrical field in selected drives. For the crossing drive, the braking effect is reduced such that the torque is reduced.

In the following, N_drives refers to a total number of drives, and each drive may have a drive-number N. Likewise, x refers to a total number of intersections, and each intersection may have an intersection-number X. The yawing assembly may be provided with a number, n, of drives which number is different from the number, x, of intersections, and particularly, when at least one of x and N is a prime number and x and N are different numbers, there will never be two drives situated at an intersection at the same time and at least N_drives minus one drive will be operable to exert a torque which is higher than the reference torque.

The reduced torque may be defined as an individual torque for each intersection, such that, for each intersection, there is an individually defined reduced torque.

The reduced torque may be defined based on a severity of an irregularity caused by the intersection between two sections, and it may e.g. be defined as a percentage of the reference torque.

The reduced torque, e.g. the percentage relative to the reference torque, may be dynamically updated based on a response from a drive moving across the location of intersection.

The torque may be increased relative to the reference torque for one or more drives not being crossing drives. This may provide sufficient torque for yawing the nacelle even in high wind conditions and counteract the loss of torque from the crossing drive.

According to a second aspect the invention provides a wind turbine with a yawing assembly comprising a drive-ring and a plurality of drives configured to exert a torque during movement along the drive-ring and thereby move the nacelle relative to the tower, the drive-ring being constituted by a plurality of drive-ring segments joined in intersections, the wind turbine comprising a yaw controller configured for:
 defining locations for the intersections relative to the drives, defining a reference torque exerted by the drives when moving along the drive-ring, defining a reduced torque being lower than the reference torque, and exerting the reduced torque by a crossing drive while the crossing drive is passing an intersection.

Since the intersections are defined already when the wind turbine is designed, the controller may be programmed to reduce the torque when passing each intersection and thereby increase the lifetime even for a large wind turbine with segmented drive-ring. One advantage can be obtained in the design phase where the drive-ring can be dimensioned based on the strength of the ring itself without needing to adjust for the reduced strength at the intersections.

The wind turbine may comprise a position sensor configured to determine a position of each drive relative to each intersection, and particularly, a position sensor arranged at each intersection.

Any of the features mentioned relative to the method of the first aspects of the invention may apply also to the wind turbine according to the second aspect of the invention.

LIST OF DRAWINGS

In the following, embodiments of the disclosure will be described in further details with reference to the drawing in which.

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

Figure 1:
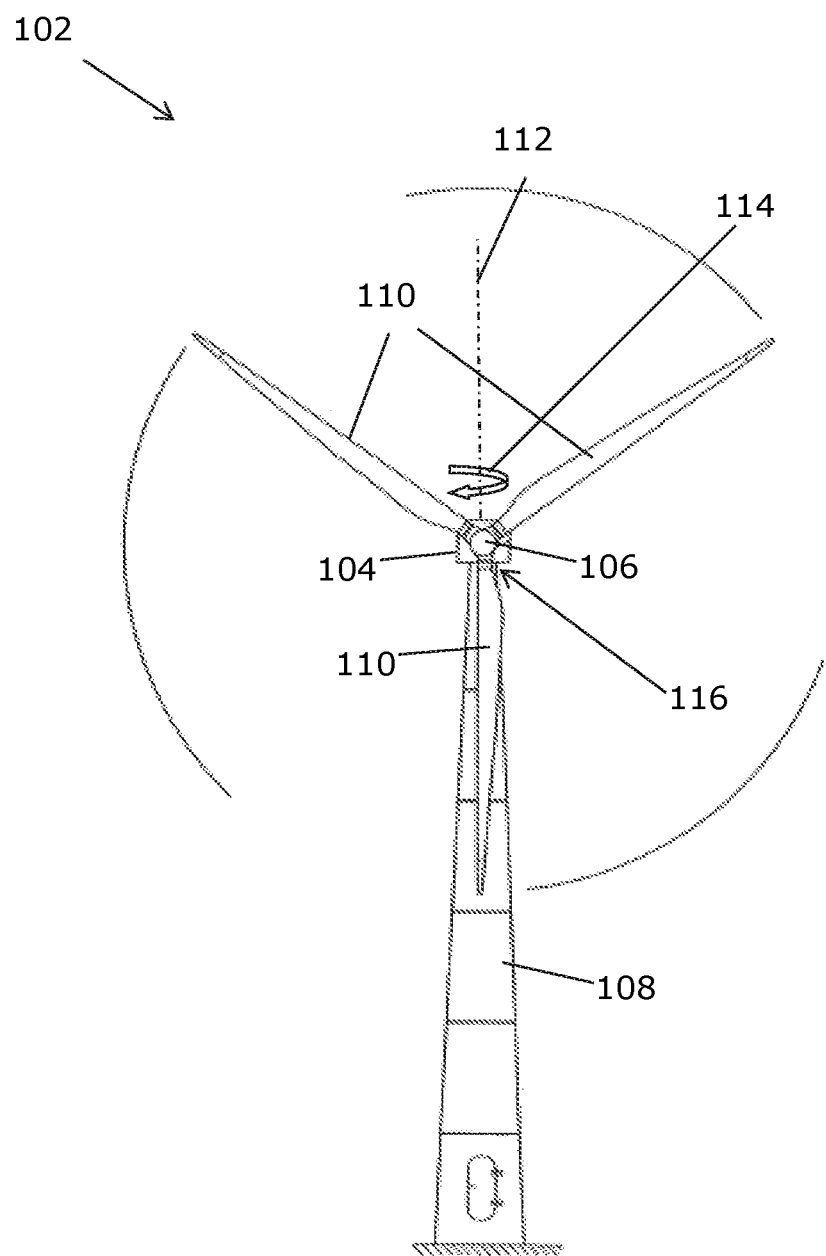
FIG. 1 illustrates a wind turbine.

FIG. 1 shows a wind turbine 102 with a nacelle 104, and a hub 106 with blades 110 rotating relative to the nacelle 104 via a main shaft. The wind turbine comprises a yawing assembly allowing the nacelle to rotate around a main axis 112 of the wind turbine tower 108, illustrated by the arrow 114. The wind turbine is a horizontal axis wind turbine, but the invention may apply equally to a Multi-rotor wind turbine or other kinds of wind turbines.

Figure 2:
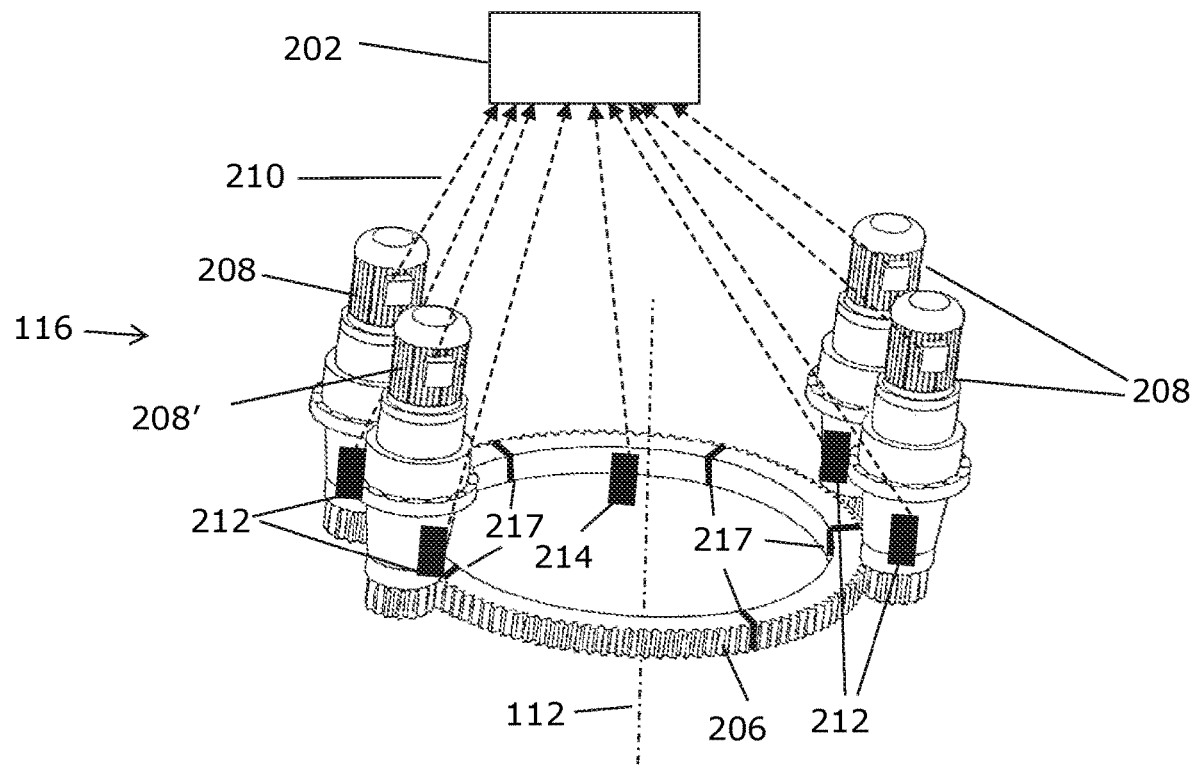
FIG. 2 illustrates a yawing assembly.

FIG. 2 illustrates the yawing assembly 116 and a yaw controller 202. The yawing assembly comprises a drive-ring 206 having a tooth structure, and a plurality of drives 208 configured to exert a torque during movement along the drive-ring and thereby move the nacelle relative to the tower.

The drive-ring is attached to one of the nacelle and the tower and the drives are attached to the other one of the nacelle and the tower. In the illustration, the drive-ring has external toothing, but it may, alternatively, have other toothing structures, e.g. internal toothing.

Each drive is constituted by a pinion gear and a motor, in this case an electric yaw motor, but alternatively a hydraulic motor configured to drive the pinion gear which engages the drive-ring.

The yaw controller may generally operate in accordance with known control methods and with the ability to control each drive individually. The controlled parameter may e.g. be torque, speed, or position, or combinations hereof. The controller may therefore be configured to reduce the torque applied by each drive, individually. The torque may be reduced to a percentage of the reference torque or it may be reduced to zero, e.g. by switching the crossing drive off. The drive may even provide a negative torque, i.e. against the driving direction.

In one implementation, the yaw motors are on/off controlled, which herein means that the motors of the drives are switched off when their position is near the intersection, e.g. by a position sensor or controlled by a controller based on knowledge about speed and acceleration. The angular speed and acceleration can be determined e.g. by use of encoders mounted either on each motor or on the interface between the tower and nacelle, e.g. on the drive-ring. If the motors are switched off, the resulting torque will typically be negative since the movement of the nacelle relative to the tower will have to move the drive which is switched off.

In another implementation, the yaw motors receive a rotation angle input via the communication path illustrated by the dotted lines 210 and they have an angle sensor 212. The rotation angle input may e.g. be a specifically desired angle and torque, or it could be duration of operation and a torque. Upon receiving this input, the drive determines, by internal control, how to operate to obtain the desired torque and angle or duration of operation.

The angle sensor 212 is arranged to sense an angular output of the drive 208. In order e.g. to monitor a complete transmission chain of the yawing system in one step, the yawing system or yawing monitoring system in the shown embodiment further includes a nacelle angle output sensor 214 positioned and adapted for determining the rotation angle of the wind turbine nacelle relative to the tower.

The drive-ring is constituted by a plurality of drive-ring segments joined in intersections 217. This facilitates easier transport and particularly for very large wind turbines, it facilitates and easier and cheaper manufacturing of the wind turbine.

The illustrated drive ring is toothed externally and interacts with pinion gears of the drives, e.g. in the shape of a tooth wheels on each drive. The interaction between the drives and the drive-ring could be made in different other ways, e.g. based on friction or via a chain and sprocket wheels.

In one implementation, the yaw controller 202 receives position information and controls the yaw motors to start and stop. In another implementation, the yaw controller 202 is arranged to receive the rotation angle input 210, possibly of each of the plurality of yaw motors 208, to receive the angular output of each of the plurality of yaw motors 208, as sensed by the angle sensors 212, and to receive the rotation angle of the wind turbine nacelle relative to the wind turbine tower. The yaw controller 202 is adapted to define a location for each intersection, define a reference torque exerted by the drives when moving along the drive-ring, define a reduced torque being lower than the reference torque, determine a time step in which a crossing drive moves across the location of an intersection, and to send a signal via the communication path 210 to the drives to exert the reduced torque by the crossing drive in the determined time step.

In FIG. 2, the drive 208' is a crossing drive since it is passing an intersection 217 between two drive-ring segments.

The drive-ring segments are joined e.g. by assembly elements, e.g. bolted to the drive-ring segments, or the drive-ring segments are welded. Irrespective of the assembly procedure, errors and irregularities may cause increased wear on the drives.

Figure 3:
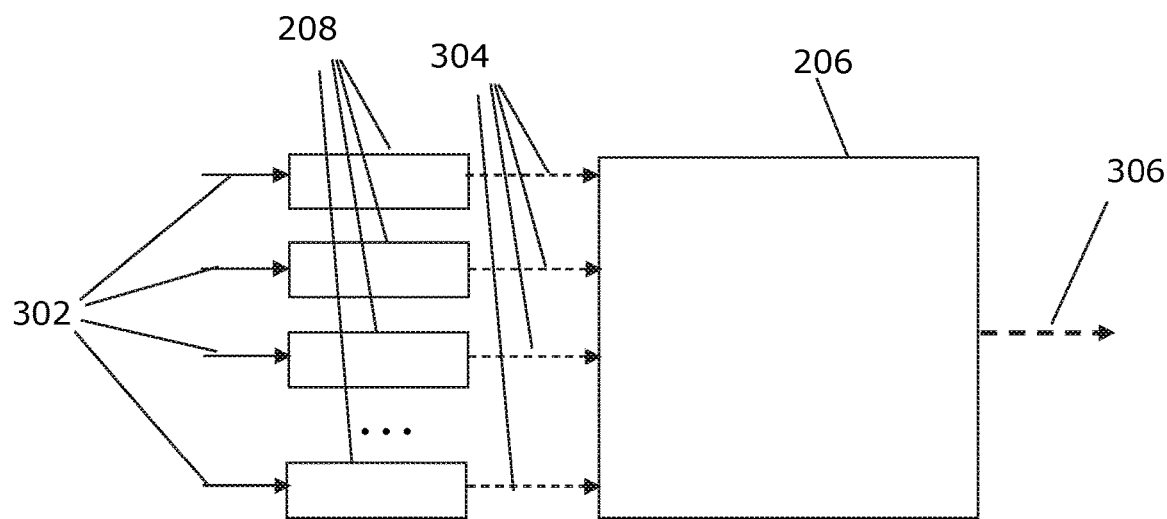
FIG. 3 illustrates schematically a control system for controlling yawing.

FIG. 3 is an angle input-output illustration of a transmission chain of the yawing system. The illustration shows the input 302 which contains an angle and a desired torque, or duration of operation and a desired torque. The input is received by the plurality of drives 208. The input 302 are generated by the yaw controller 202 shown in FIG. 2. Possibly the input 302 is the same for each drive except the crossing drive for which a lower torque is specified.

A measured angle output of each drive 208 is measured or sensed at 304 by measuring a gear angle output 306.

The illustrated drives may operate both in a drive mode where they actively rotate the nacelle, and in a brake mode where they brake or prevent rotation of the nacelle.

By providing the yawing assembly with a number, n, of drives which is different from the number, x, of intersections between equally large drive-ring segments, and particularly by providing the number such that N_drives is a prime number and x is different from N, there is no risk of two drives both being crossing drives simultaneously. In FIG. 2, the number of drives, n, is 4 and the number of segments, x, is 5, which is a prime number.

Figure 4:
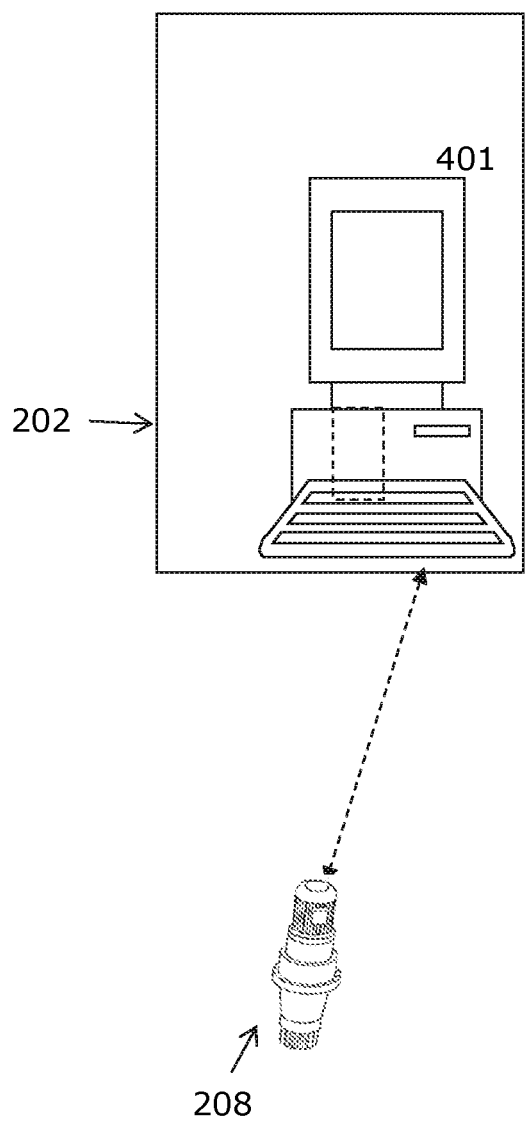
FIG. 4 illustrates an advanced yaw controller.

FIG. 4 illustrates an advanced version of the yaw controller 202 including a computer system 401 configured to define the reduced torque individually for each intersection. The computer system may e.g. have information related to the irregularity, e.g. the size of an off-set between adjacent segments, and thereby an expected wear caused by each intersection. The computer system may be configured to calculate a reduction in torque which is desired considering the irregularity. The reduced torque may e.g. be defined as a percentage of the reference torque, and the percentage may be defined based on a severity of an irregularity caused by the intersection between two sections. The computer may, in a first operation mode have a fixed setting of the reduced torque, and in a second operation mode, it may dynamically update the setting of the reduced torque, e.g. based on a response from a drive moving across the location of intersection.

The yaw controller may also calculate an increased torque for upgrading the output of those drives which are not crossing drives, and thereby compensate for the reduction in torque applied by the crossing drive. In one implementation, the difference between the reference torque and the reduced torque is split between the non-crossing drives, and that amount is added to the torque of the non-crossing drives.

The yaw controller may calculate a total accumulated torque for each intersection or calculate a number of times an intersection has been passed by a drive. Based on the total torque or number of passing, it may determine the level of the reduction, i.e. the reduced torque.

Figure 5:
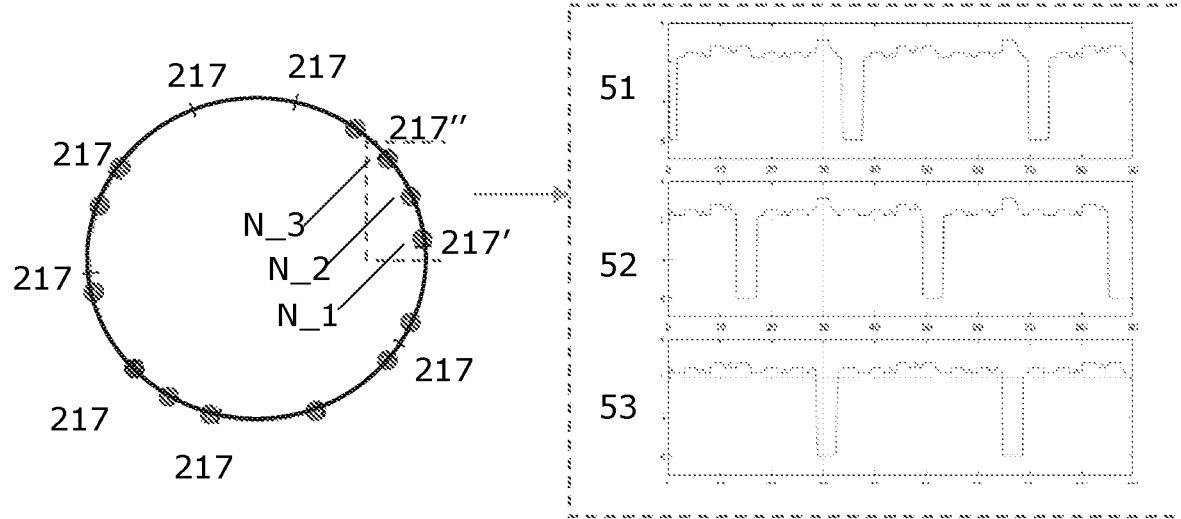
FIGS. 5-8 illustrate a control sequence while two drives are passing an intersection.

FIGS. 5-8 illustrate a control sequence while drives are passing an intersection. In FIG. 5, the drives N_1, N_2 and N_3 are monitored by the ratio diagrams 51 (N_1), 52 (N_2), and 53 (N_3). The intersections are marked 217. In FIG. 5, the intersections 217' and 217" are on opposite sides of the monitored drives N_1, N_2, and N_3 and none of the monitored drives N_1, N_2, and N_3 are considered crossing drives.

Figure 6:
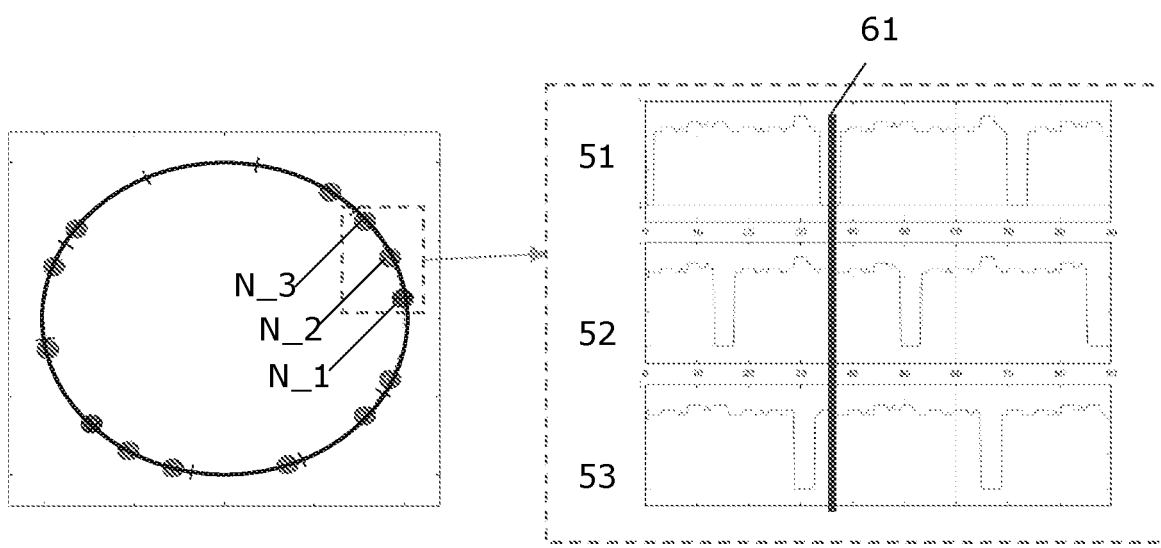

In FIG. 6, it is illustrated that the torque of N_1 is reduced, i.e. the torque curves are at the location illustrated by the vertical line 61.

Figure 7:
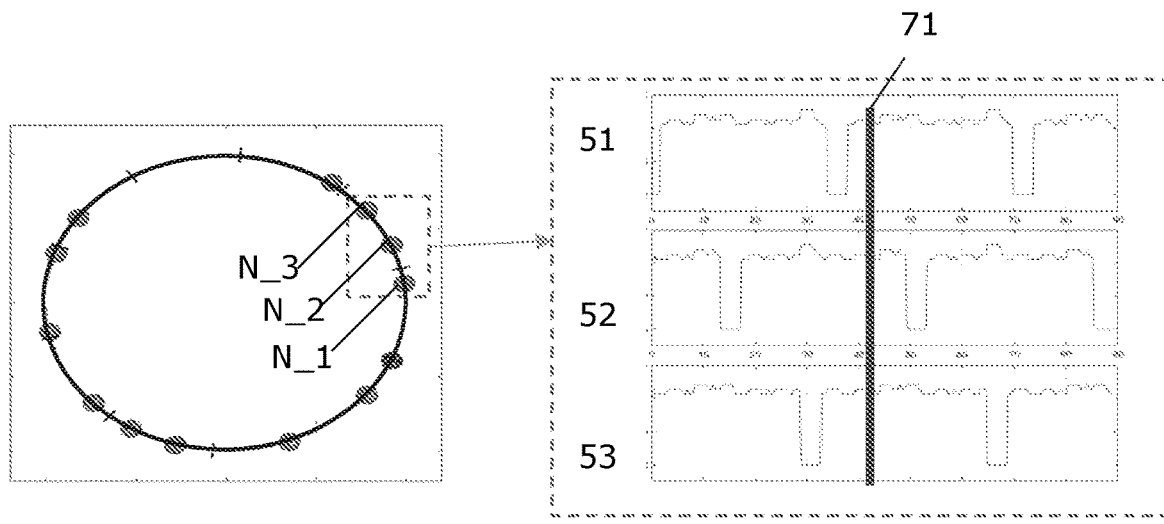

In FIG. 7, it is illustrated that the torque of none of N_1, N_2, and N3 is reduced, i.e. the torque curves are at the location illustrated by the vertical line 71.

Figure 8:
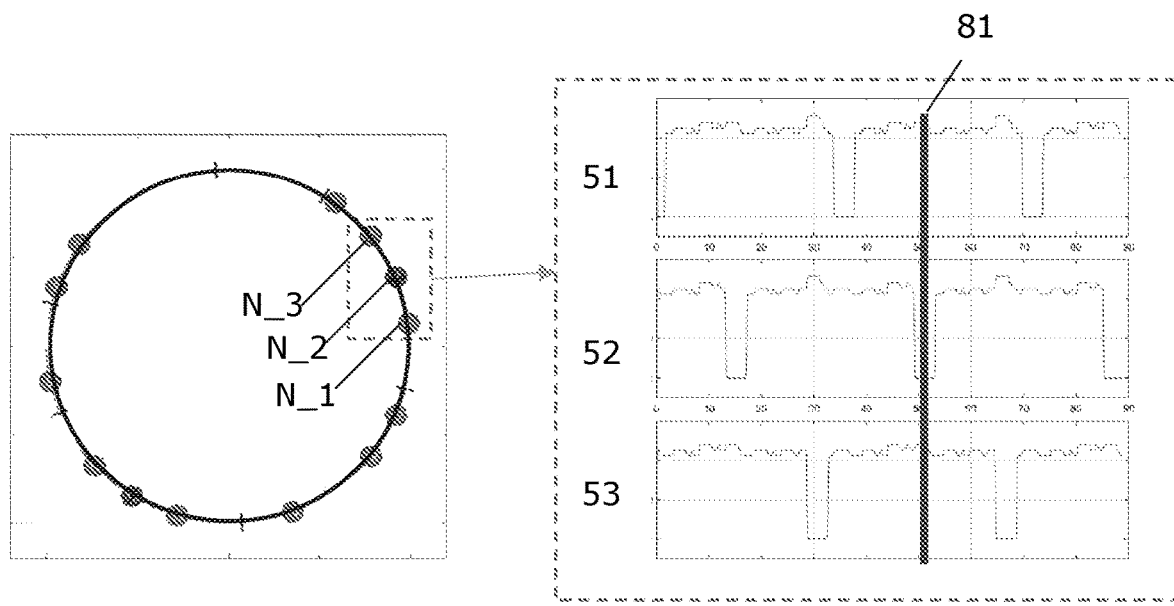

In FIG. 8, it is illustrated that the torque of N_2 is reduced, i.e. the torque curves are at the location illustrated by the vertical line 81.

The strategy of the torque reduction may be explained as follows:

Identify all the drives, N_crossing, which are within a certain distance, ±Δθ, from an intersection by setting Reduce=1 for those drives. When one or more drives enters or leaves the intersection distance, ±Δθ, the yaw angle is saved as θ_trig. Similarly, all the current output ratios for every drive is saved as [ ratio] _ol=ratio.

Determine the factor, δ_increase, that the drives that are not near a segment should be increased to compensate for the torque reducing across the other drives. The total number of drives is N_drives and δ_reduce is the reduction factor. This should ensure that the combined motor torque always equals the total torque reference, i.e.

$$N\_crossing \delta\_reduce + (N\_drives - N\_reduce)$$
$$\delta\_increase = N\_drives$$

$$\delta\_increase = (N\_drives - N\_crossing \delta\_reduce) / (N\_drives - N\_crossing)$$

Relative to active yawing, the torque from one drive can be reduced when passing an intersection by use of positioning feedback.

Store the reduction factor $\delta_{reduce}$ and increase factor $\delta_{increase}$ as reference values every time they are changed.

Figure 9:
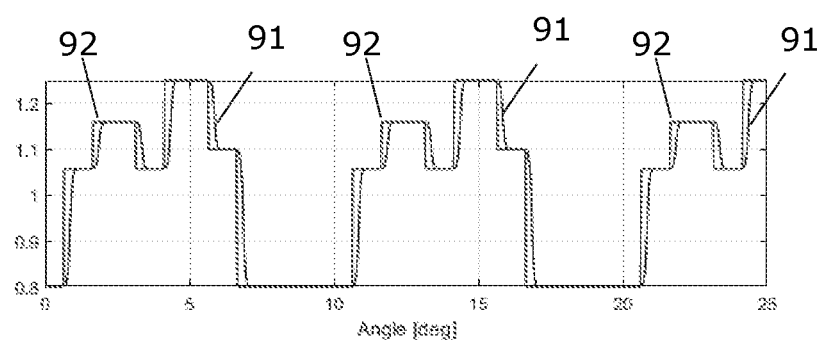
FIG. 9 illustrates a resulting ratio for a single drive.

FIG. 9 illustrates a resulting ratio for a single drive. The resulting ratio for a single drive may look like that shown below when δreduce=0.8.

It is seen that the output ratio 91 is simply a smooth version of the reference ratio 92 due to the sigmoid function. The function is shifted by δ_θ to start at zero very close to the change in the input ratio. If a steeper or a less steep slope is desired, this could simply be obtained by changing α, but the important area is where the ratio is 0.8 due to a reduction over a segment. Arguably, this could be shifted such that the segment split is directly in the middle, which would require Δθ to be larger before a split than after the split.

The invention claimed is:

1. A method of yawing a nacelle relative to a tower in a wind turbine having a yawing assembly comprising a drive-ring and a plurality of drives configured to engage with the drive-ring and exert a torque and thereby move or stop movement of the nacelle relative to the tower, the drive-ring being constituted by a plurality of drive-ring segments joined in intersections, the method comprising:
    defining locations of the intersections relative to the drives;
    defining a reference torque expected to be exerted by the drives;
    defining a reduced torque being lower than the reference torque; and
    exerting the reduced torque by a crossing drive while the crossing drive is passing an intersection.

2. The method of claim 1, wherein the reduced torque is a driving torque exerted by the crossing drive for causing movement of the nacelle relative to the tower.

3. The method of claim 1, wherein the reduced torque is a braking torque exerted by the crossing drive for counter-acting movement of the nacelle relative to the tower.

4. The method of claim 1, wherein the yawing assembly is designed to prevent more than one drive passing an intersection simultaneously.

5. The method of claim 4, wherein, at least one of the number x of intersections and the number N_drives of drives, is selected as a prime number, and wherein x is different from N_drives.

6. The method of claim 1, wherein the reduced torque is defined as an individual torque for each intersection.

7. The method of claim 1, wherein the reduced torque is defined as a percentage of the reference torque.

8. The method of claim 1, wherein the reduced torque is defined based on a severity of an irregularity caused by the intersection between two sections.

9. The method of claim 1, wherein the torque is increased relative to the reference torque for one or more drives not being crossing drives while the torque for a crossing drive is reduced.

10. The method of claim 1, wherein a total torque is defined as the sum of torque exerted by the sum of drives, continuously determined over time.

11. The method of claim 10, wherein the reduced torque is determined based on the total torque or total number of times an intersection has been passed by a drive.

12. The method of claim 1, wherein a total number of times an intersection has been passed by a drive is determined.

13. The method of claim 1, comprising preventing stopping of the nacelle relative to the tower at an interference position where a drive is located at an intersection.

14. The method of claim 13, wherein the stopping of the nacelle relative to the tower at the interference position is prevented by controlling a braking sequence to avoid stopping at the interference position.

15. The method of claim 13, wherein the stopping of the nacelle relative to the tower at the interference position is prevented by actively moving the nacelle away from the interference position by use of the drives.

16. The method of claim 1, comprising defining a reduction zone extending across the intersection, and reducing the torque for the crossing drive in the reduction zone.

17. The method of claim 16, wherein the reduction zone is defined as a variable setting in a controller of the yawing assembly.

18. The method of claim 1, wherein the drives are controlled by switching the crossing drive off.

19. A wind turbine, comprising a tower and a nacelle, and with a yawing assembly comprising a drive-ring and a plurality of drives configured to exert a torque and thereby move or stop movement of the nacelle relative to the tower, the drive-ring being constituted by a plurality of drive-ring segments joined in intersections, the wind turbine comprising a yaw controller configured for:
defining locations for the intersections relative to the drives;
defining a reference torque exerted by the drives;
defining a reduced torque being lower than the reference torque; and
exerting the reduced torque by a crossing drive while the crossing drive is passing an intersection.

20. The wind turbine according to claim 19, comprising a position sensor configured to determine a position of each drive relative to each intersection.

21. The wind turbine according to claim 19, comprising a position sensor arranged at each intersection.

22. The wind turbine according to claim 19, wherein the yaw controller is configured to controller each drive individually.

23. The wind turbine according to claim 19, wherein the yaw controller is configured to switch each drive on or off individually.

* * * * *